United States Patent [19]
Lemaire et al.

[11] Patent Number: 5,613,038
[45] Date of Patent: Mar. 18, 1997

[54] COMMUNICATIONS SYSTEM FOR MULTIPLE INDIVIDUALLY ADDRESSED MESSAGES

[75] Inventors: Charles A. Lemaire; Bryan L. Striemer, both of Zumbrota, Minn.

[73] Assignee: International Business Machines Corporation, Armonk, N.Y.

[21] Appl. No.: 993,278

[22] Filed: Dec. 18, 1992

[51] Int. Cl.⁶ ................. G10L 5/02; G10L 9/00
[52] U.S. Cl. ............ 395/2.69; 395/2.67; 395/2.79
[58] Field of Search ................. 381/42, 43, 51; 340/825.44; 395/2, 2.69, 2.4, 2.55–2.68; 379/100

[56] References Cited

U.S. PATENT DOCUMENTS

| | | | |
|---|---|---|---|
| 4,479,124 | 10/1984 | Rodriguez et al. | 340/825.44 |
| 4,692,941 | 9/1987 | Jacks et al. | 395/2.69 |
| 4,837,798 | 6/1989 | Cohen et al. | 379/88 |
| 4,965,569 | 10/1990 | Bennett et al. | 340/825.44 |
| 4,968,966 | 11/1990 | Jasinski et al. | 340/825.44 |
| 4,996,707 | 2/1991 | O'Malley et al. | 379/100 |
| 5,025,373 | 6/1991 | Keyser, Jr. et al. | 364/408 |
| 5,040,218 | 8/1991 | Vitale et al. | 395/2.69 |
| 5,068,898 | 11/1991 | Dejmek et al. | 381/29 |
| 5,157,759 | 10/1992 | Bachenko | 395/2 |
| 5,185,604 | 2/1993 | Nepple et al. | 385/825.44 |
| 5,212,731 | 5/1993 | Zimmermann | 395/2.69 |
| 5,315,642 | 5/1994 | Fernandez | 379/96 |
| 5,327,498 | 7/1994 | Hamon | 381/51 |

*Primary Examiner*—Tariq R. Hafiz
*Attorney, Agent, or Firm*—Owen J. Gamon; J. Michael Anglin

[57] ABSTRACT

A communications system has a single transmitter and a large number of portable receivers. The transmitter broadcasts a continuous stream of coded text messages, each addressed to a particular user or group of users. Each receiver demodulates all the messages, compares their addresses with a list of addresses in the receiver, and stores only those messages having one of the proper addresses. The user can activate the receiver to play back messages in the memory, and to choose among the stored messages. The messages selected for playback are converted from digital text to a synthesized voice, sent as an audio signal to the user.

8 Claims, 4 Drawing Sheets

COMMUNICATIONS SYSTEM FOR MULTIPLE INDIVIDUALLY ADDRESSED MESSAGES

BACKGROUND OF THE INVENTION

The present invention relates to broadcast communications systems, and more specifically concerns such systems in which each item to be broadcast designates a particular destination receiver or group of receivers.

A conventional radio pager service broadcast contemplates a single series of data items individually addressed to particular receivers. Some services have the original caller speak a short (analog) spoken message for the receiver (spoken message systems). Other systems have the original caller press a few buttons indicating a phone number for the receiving user to call to answer the page (digital number storage systems). Receiver devices of the latter type allow storage of a few (perhaps 8) of the numbers of the most recent pages.

Additionally, the listeners of the spoken-message type systems must be available and interrupt what they are doing at the time the items are transmitted; delayed listening via recording is not very practical. The analog voice nature of radio broadcasts also makes them rather wasteful of scarce spectrum resources. The page message of today's systems is necessarily very short: ten seconds of spoken message, or a single digitally coded telephone number.

Solutions to the above problems still fall short in many respects. The recipient must read a tiny display, or attend to any message being broadcast. A large number of people who need to be paged with electronic mail and other individualized messages could benefit greatly from a service using the paradigm of a radio text broadcast which can be individually targeted to particular users' or listeners' specific interests, and which can be listened to at any time convenient to them.

SUMMARY OF THE INVENTION

The present invention provides apparatus and methods for personalizing or tailoring destination addresses for digital text mail and pager services to the specific requirements of each individual user of the system. The messages can be listened to at any convenient time and place, regardless of the actual time of transmission. They can be skipped, repeated, erased, and otherwise manipulated; these operations can be performed in an easy, intuitive way using controls already familiar to most users. Because the items are presented aurally rather than visually, driving, walking, or other activities can be engaged in while the user receives the information. Receiver units can be made physically small enough that they can be carried about on the user's can also be fitted in cars or other locations not normally available for receiving such messages.

Briefly, such a communications system includes a single transmitter and a large number of portable receivers. The transmitter broadcasts a signal over a medium a continuous stream of coded text messages, each addressed to a particular user or group of users. Each receiver includes a demodulator for continuously receiving the broadcast signal, and means to compare the address of incoming messages with a list of addresses in the receiver and storing only those incoming messages having one of the proper addresses. The user can activate the receiver to play back messages in the memory, to choose among the stored messages, and to erase them. The messages chosen for playback are converted from digital text to a synthesized voice, which is sent as an audio signal to the user.

DESCRIPTION OF A PREFERRED EMBODIMENT

Figure 1:
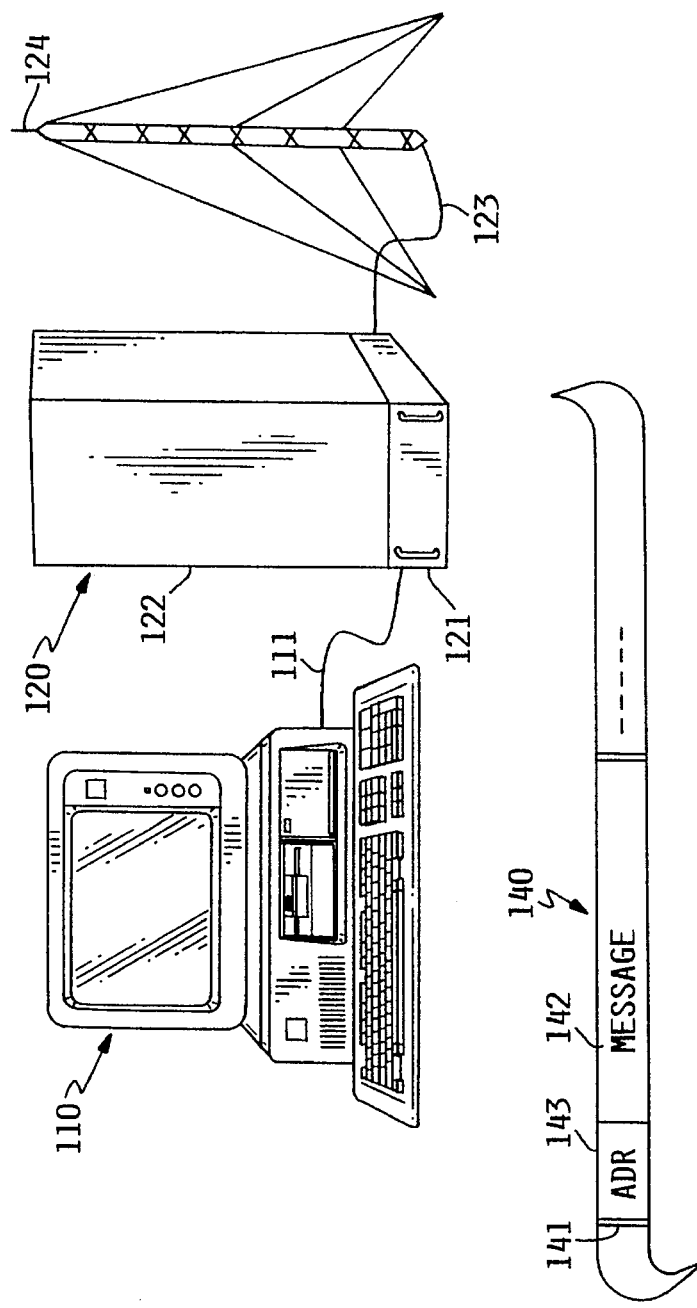
FIG. 1 is a partially schematic representation of a communications system according to the invention.
Figure 1:
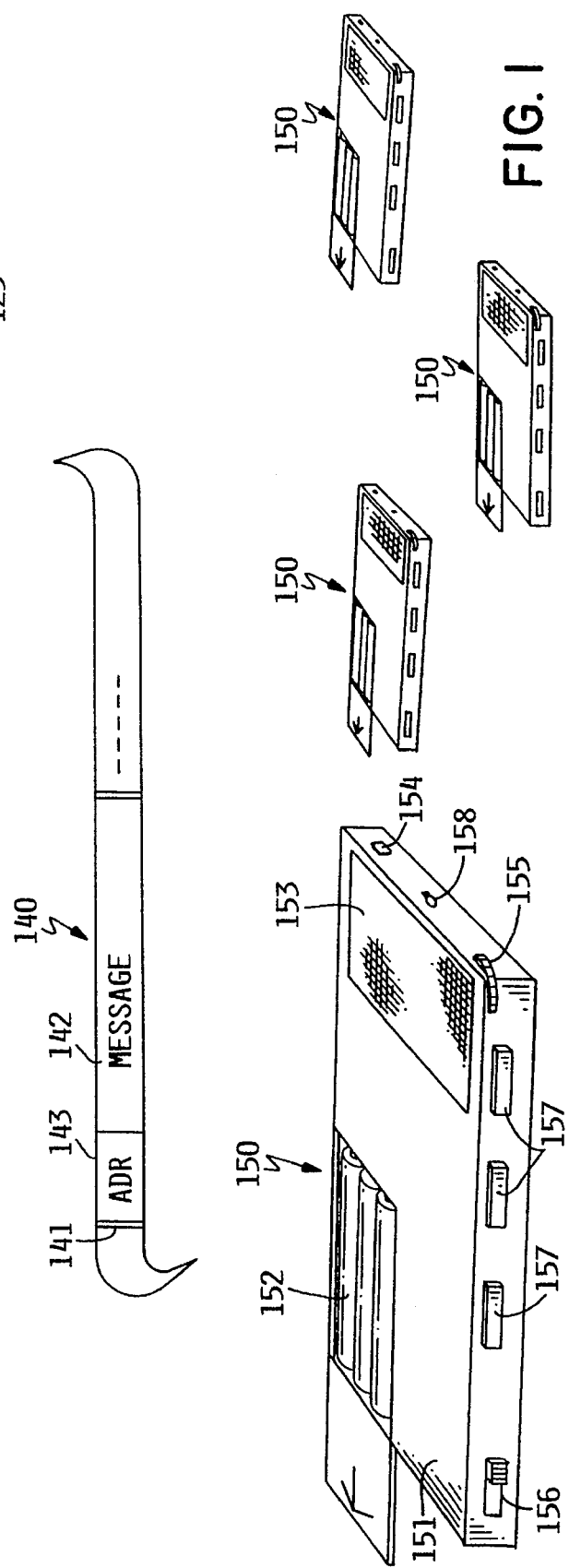

FIG. 1 illustrates an overall communications system 100 which embodies the present invention. Input device, here shown as a modem 110, represents a source of digitally coded text items, such as electronic messages. Input device 110 could include a telephone voice response interface (TVRI) already well known to the art such as the publicly available IBM CallPath DirectTalk/2 (tm) telephone and voice interface product for IBM compatible personal computers. Such TVRI units are in common use at banks and insurance companies to provide customers a convenient way to access account information. The telephone voice response interface would allow the computer to automatically answer telephone calls incoming to a pager service. Unit 110 could also represent a gateway for multiple sources of messages for serializing the items into a single data stream on an output means 111 such as a cable or microwave feed.

Message stream 140 shows schematically the format of the text messages. Each message 141 has text characters 142 representing the information to be transmitted; this information may include, in addition to the content of the message itself, ancillary information such as a subject description, the originator's name, and classification information. Each message also includes an identification code 143. A single receiver 150 which uniquely specifies this identification code allows for reception of information uniquely addressed to one individual. If a small group of receivers each specify the same identification code, that allows simultaneous reception of information destined for that group of receivers. If all data receivers additionally specify one common identification code, this allows reception of a single information broadcast simultaneously by all users of data receivers. Typically, each receiver is programmed to specify one unique identification code (the unique identification code for one user), several group codes, one group code for each group where this user is a member of the group, and one universal identification code which is common to all receivers. The uniqueness may of course be limited to a geographic reception area, or to a particular radio-frequency channel.

If the major or only use of the text items is for receivers according to the present invention, then the digital codes need not be character codes in a standard set. For example, codes for word parts or speech allophones could be transmitted directly. Special codes for inflection and phrasing could additionally be included. Also, music codes in the standard musical instrument digital interface (MIDI) protocol could be included.

Cable 111 routes the digital items to transmission means 120. In this embodiment, transmission means 120 is a standard commercial FM transmitter. Transmitter 120 includes a modulator 121 and a radio-frequency generator 122 for sending a conventional FM signal over cable 123 to an antenna 124. The antenna could be located outdoors with power to service a several mile radius or it could be an indoor antenna with a radius of only an office building. If single-building or office service is sufficient, a conventional infrared system could be used instead of a radio medium.

Item stream 140 is shown as being broadcast from transmitting antenna 124 to a large number of receiving means 150 simultaneously. These receiving means may be similar in many ways to the portable computer devices for audible processing of electronic documents as described in copending commonly assigned application Ser. No. 07/671,329, filed Mar. 19, 1991 by Lemaire et al., which is hereby incorporated by reference. In particular, a receiving device may be constructed in a plastic or metal case 151 small enough to be carried in the hand or pocket by an individual user, and powered by batteries 152. (Other versions may be constructed in the form of automobile radios or small desktop units as well.) A small speaker 153 and/or headphone jack 154 provide an audio output to the user directly. A conventional volume-control wheel 155 provides a volume control. Power switch 156 turns the unit off and on; in some cases, a portion of the electronics in the case may be left powered on continuously even when switch 156 is off. Mode-control buttons 157 are placed on the case in such a manner as to be easily accessible to the user, preferably by feel alone; these are constructed similarly to the buttons on a hand-held cassette-tape recorder. That is, the physical size and configuration make receiving means 150 personal to an individual user.

An alternate method of mode control is speech recognition. Often the eyes-busy environment is also a hands-busy environment—i.e. doctors performing medical examinations. A small vocabulary speech recognition method could be incorporated either into the radio receiver 150 or be part of a desktop workstation (not shown), which then controlled the radio receiver with a secondary—very short distance—uniquely addressed, unidirectional radio signal.

Figure 2:
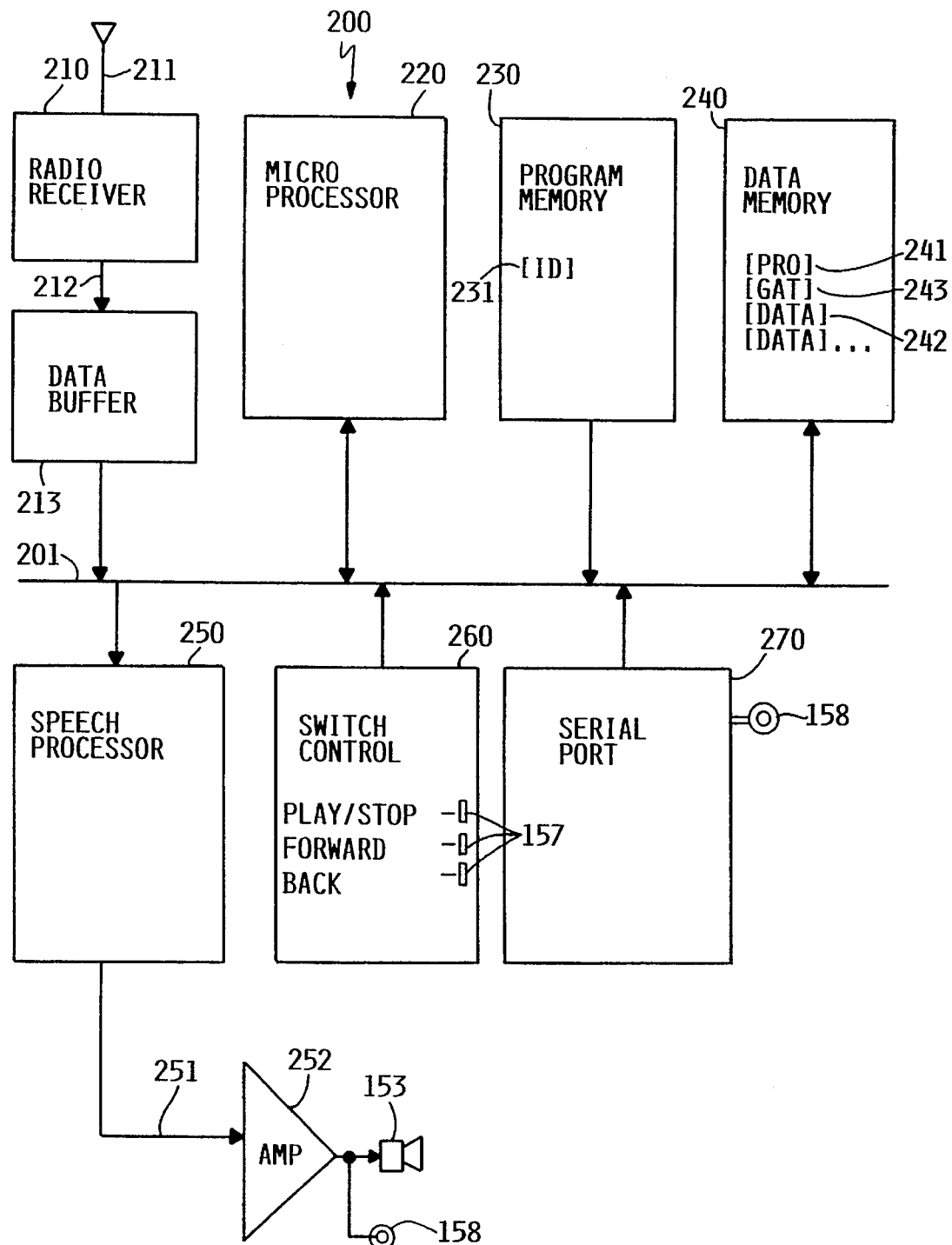
FIG. 2 is a block diagram of a receiver of FIG. 1.

FIG. 2 is a high level block diagram of receiving means 200, FIG. 1. Radio receiver 210 continuously picks up the radio signal broadcast from transmitter 100, FIG. 1, and demodulates it to a baseband serial digital signal on line 212. Receiver or demodulator 210 is conventionally available as a single chip which, with the addition of a few components, operates as a complete FM-band radio receiver. A buffer storage 213 converts the serial signal to parallel digital character codes, and provides them to bus 201.

Microprocessor 220 executes programs stored in read-only memory (ROM) 230, under the control of a conventional real-time event-driven operating system, also stored in ROM 230. One of these programs periodically matches identification addresses in buffer 213 against individual and group addresses as well as information items broadcast to all users.

Data memory 240 stores each item as a block of bytes 242 of variable length. All of the blocks 242 together form a sequence of items stored in the data memory.

Speech processor 250 is a conventional single-chip speech synthesizer for converting digital character codes into an analog signal 251 representing a synthetic voice. Normally, microprocessor 220 executes a text-to-speech program stored in ROM 230 for converting a string of textual character codes in an item 242 into digital codes representing allophones or other specialized codes; these codes are then gated to speech processor 250 over bus 201. Amplifier 252 produces an audio signal strong enough to drive speaker 153, headphone jack 154, or another audio output device, as shown in FIG. 1. Alternatively, direct text-to-waveform programs are now becoming available; such a program could perform the functions of speech processor 250 within microprocessor 220.

Switch controller 260 may be an integrated-circuit register or other interface for the mechanical buttons 157 shown in FIG. 1. (Also, as mentioned earlier, the "switches" could be signals generated from speech recognition of voice commands from the user.) In this embodiment, there are three user buttons, labelled PLAY/STOP, FORWARD, and REWIND. (As mentioned earlier, the control functions could also be speech recognition rather than actual buttons.) Microprocessor 220 periodically scans these switches (or receives a command-level unidirectional radio signal) and executes the appropriate audio-output function based upon their state.

Figure 3:
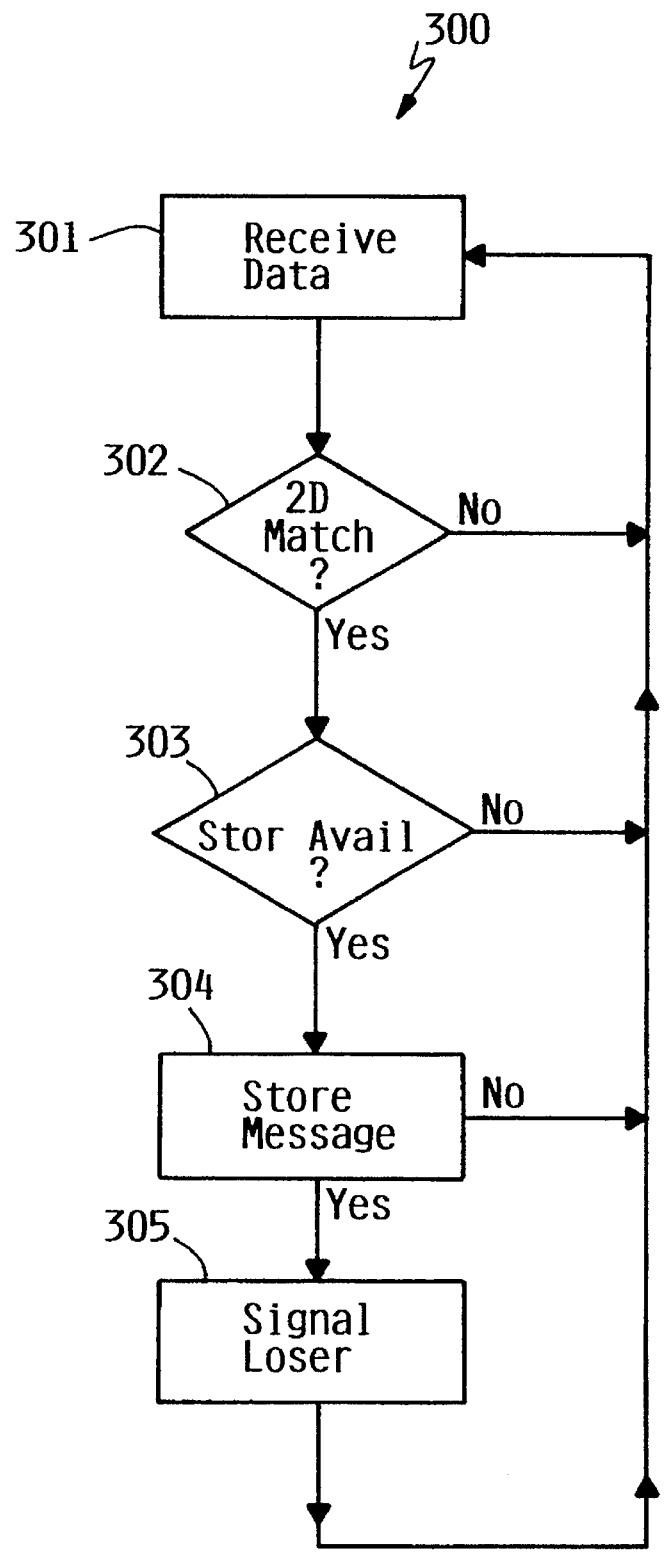
FIG. 3 is a high-level flowchart depicting the receipt of messages by the receiver of FIG. 2.

FIG. 3 is a flowchart 300 of a program from ROM 230 executed by microprocessor 220 for receiving data items. As data messages come into the radio receiver at block 301, the processor checks the identification numbers against those stored in the receiver at block 302. If a match is found, the message is accepted. Block 303 checks for available data storage, and block 304 stores the message. At the completion of a message reception into memory, block 305 signals the user that a message has been received 304. This signal is either an audio "beep" or can be momentary activation of a vibrating device embedded inside the radio receiver, as is done in some conventional radio paging receivers.

Figure 4:
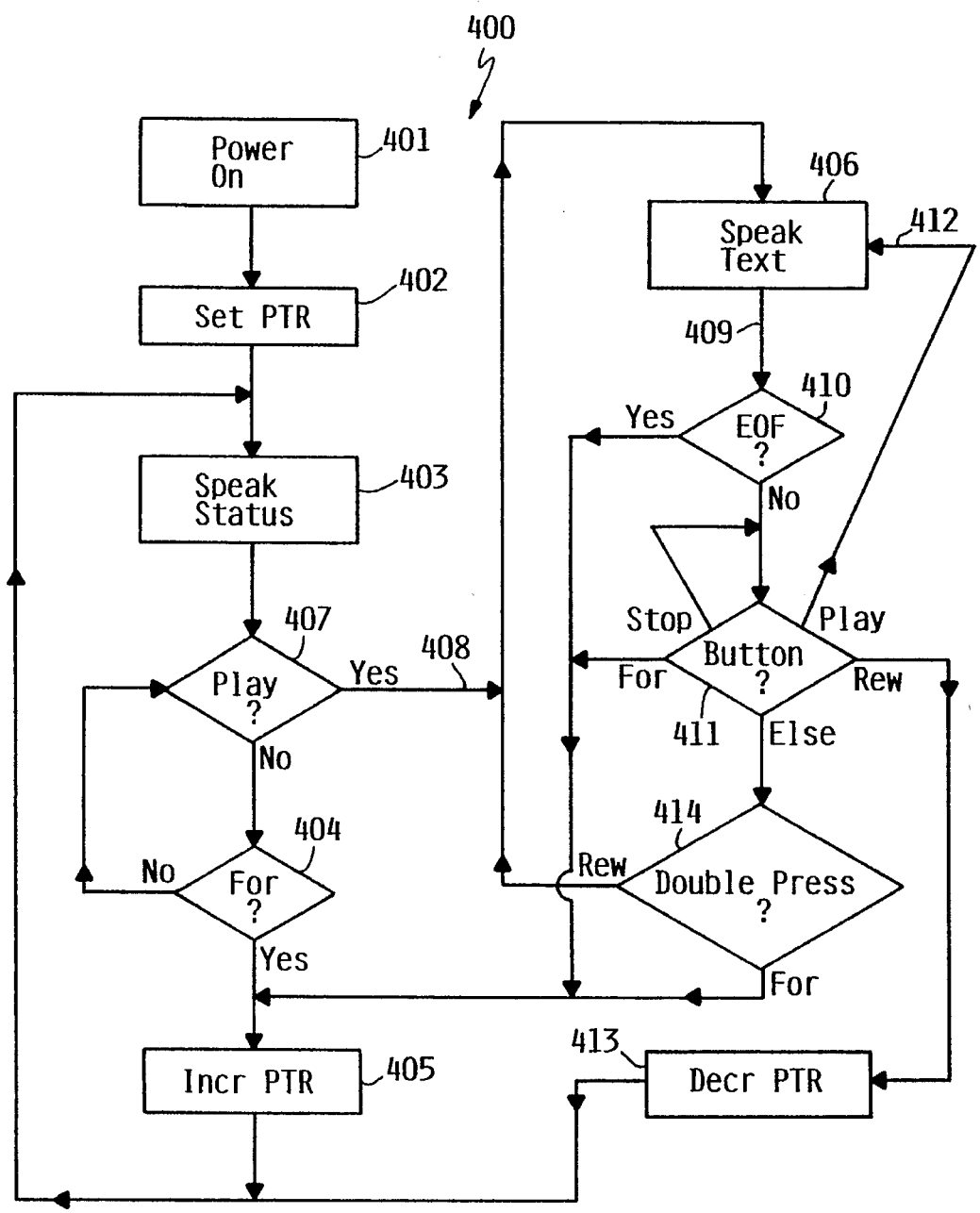
FIG. 4 is a flowchart showing the playback of messages by the receiver of FIG. 2.

The radio receiver delivers messages at the user's request. The user activates the radio receiver either through switch 156, FIG. 1, or with voice command such as "Hello Radio Receiver". The receiver is initialized and speaks a greeting (e.g., "Hello") at block 401 of program 400, FIG. 4. Block 402 sets a message pointer to the first message received, and invokes the speech synthesis function to recite a status message at block 403 telling the user how many messages are waiting in memory and reading the first message subject, originator and length. The user then has the option to continue to the next message by pressing the FORWARD button at block 404 (or saying "FORWARD"); block 405 then increments the message pointer and returns to block 403. The user can alternatively press the PLAY button (or say "PLAY") at block 407 to ask that the contents of the current message be read at input 408. In this embodiment, the messages are normally stored in a sequence in the order received; thus, the "next" message is the one received just after the current message, and the "previous" message is the one received just prior to the current one.

Input 408 causes block 406 to begin speaking the text of the current message at its beginning. At short (subsecond) intervals, exit 409 scans for events. Block 410 transfers control to block 405 if the current message has reached its end of file (EOF). Block 411 senses a single press of one of the control buttons. If STOP is pressed, control reenters block 411 until another button is pressed. If PLAY is pressed, entry 412 causes block 406 to continue speaking the message text at the point where it had left off at exit 409. Pressing FORWARD increments the pointer to the next message at block 405. Pressing REWIND causes block 413 to decrement the pointer, then to return to block 403. That is, STOP/PLAY, FORWARD and REWIND operate as would be expected from a typical audio tape player.

If the user wishes to listen to the message a second time, he double-presses (in rapid succession) the REWIND button (or says "READ AGAIN"). Block 414 senses this double press, and returns to entry 408 of block 406. If the user desires to jump ahead to the end of the current message, he double-presses the FORWARD button (or says "NEXT MESSAGE"). Block then returns to block 405 to change the message file pointer to point to the next message.

Having described a preferred embodiment thereof, we claim as our invention:

1. A portable communications receiver for receiving from a broadcast medium a stream of digitally coded messages each including a text portion directly representing the content of the message itself, and an address portion, comprising:

a demodulator for receiving said stream of messages from said medium;

a set of identifiers, including at least one identifier unique to said receiver;

means for comparing said identifier set with the address portion of all messages in said stream and for selecting those whose addresses match at least one identifier in said set;

means for storing the text portion of said selected messages in a sequence; and switch means operable by a user of said portable communications receiver for choosing one message among said stored selected messages, and wherein said switch means includes a first switch for sending a current one of said messages in said sequence to a text-to-speech conversion means, wherein said text-to-speech conversion means is coupled to said storing means and responsive to said switch means, for producing analog speech waveforms directly corresponding to the text portion of said one message, a second switch for choosing a next message in said sequence as said current message, and wherein another operation of said second switch increases the speed of said text-to-speech conversion means, a third switch for choosing a previous message in said sequence as said current message.

2. A portable communications receiver for receiving from a broadcast medium a stream of digitally coded messages each including a text portion directly representing the content of the message itself, and an address portion, comprising:

a demodulator for receiving said stream of messages from said medium;

a set of identifiers, including at least one identifier unique to said receiver;

means for comparing said identifier set with the address portion of all messages in said stream and for selecting those whose addresses match at least one identifier in said set;

means for storing the text portion of said selected messages in a sequence and;

switch means operable by a user of said portable communications receiver for choosing one message among said stored selected messages, and wherein said switch means includes a first switch for sending a current one of said messages in said sequence to a text-to-speech conversion means, wherein said text-to-speech conversion means is coupled to said storing means and responsive to said switch means, for producing analog speech waveforms directly corresponding to the text portion of said one message, a second switch for choosing a next message in said sequence as said current message, a third switch for choosing a previous message in said sequence as said current message, and wherein another operation of said third switch returns said text-to-speech conversion means to the beginning of said current message.

3. A portable communications receiver for receiving from a broadcast medium a stream of digitally coded messages each including a text portion directly representing the content of the message itself, and an address portion, comprising:

a demodulator for receiving said stream of messages from said medium;

a set of identifiers, including at least one identifier unique to said receiver;

means for comparing said identifier set with the address portion of all messages in said stream and for selecting those whose addresses match at least one identifier in said set;

means for storing the text portion of said selected messages;

switch means operable by a user of said portable communications receiver for choosing one message among said stored selected messages;

text-to-speech conversion means, coupled to said storing means and responsive to said switch means, for producing analog speech waveforms directly corresponding to the text portion of said one message; and control means coupled to said text-to-speech converter for causing said text-to-speech converter to speak status information concerning said sequence of stored messages.

4. The receiver of claim 3, wherein said control means causes said text-to-speech converter to speak the number of messages stored in said data storage means.

5. The receiver of claim 3, wherein each of said messages further includes ancillary information.

6. The receiver of claim 5, wherein said ancillary information includes a subject description.

7. The receiver of claim 5, wherein said ancillary information includes an originator's name.

8. The receiver of claim 5, wherein said control means is responsive to said switch means to cause said text-to-speech converter to speak at least some of said ancillary information for said current message.

* * * * *